July 29, 1941.                W. A. SCOTT                2,251,071
                    STALL COCK OF MILKING MACHINES
                         Filed Jan. 19, 1940

WITNESS:                                          INVENTOR
Rob R Mitchel                                  Walter A. Scott
                                                      BY
                                               Busser and Harding
                                                   ATTORNEYS.

Patented July 29, 1941

2,251,071

UNITED STATES PATENT OFFICE 2,251,071

STALL COCK OF MILKING MACHINES

Walter A. Scott, Poughkeepsie, N. Y., assignor to The De Laval Separator Company, New York, N. Y., a corporation of New Jersey Application January 19, 1940, Serial No. 314,641

4 Claims. (Cl. 31—58)

My invention relates to so-called "stall cocks" used on vacuum lines, extending through a cow barn, for the attachment of flexible pipe branches connected with the individual milking machines of a milking machine installation.

The object of my invention is to provide a simple and efficient cock of low cost and that is unlikely to get out of order.

While the invention is adapted for use in milking machines which are operable wholly pneumatically, it is also adapted for use in those milking machines which require also the establishment of a connection with a source of electric power. My invention, therefore, also comprises means whereby, when the attachment of a pipe branch to the main vacuum line is effected, such electric connection will be simultaneously established.

The construction of my improved stall cock and its mode of operation will be best understood by reference to the annexed drawing, which illustrates a preferred embodiment of the invention and in which—

Figure 1:
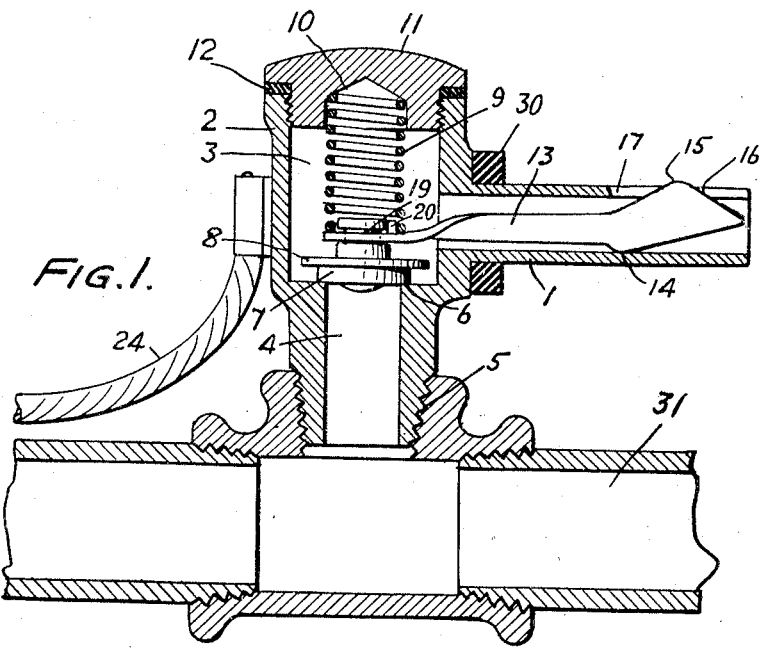
Fig. 1 is a longitudinal section of a stall cock embodying my invention.
Figure 2:
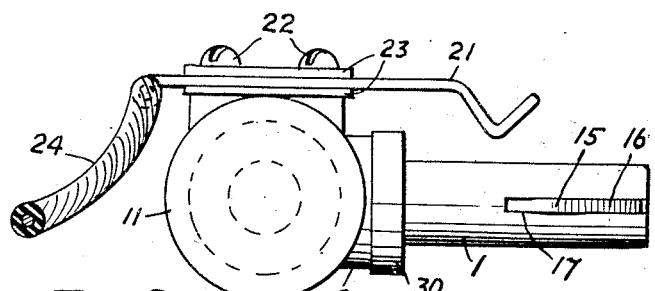
Fig. 2 is a plan view showing the means for effecting an electrical connection.
Figure 3:
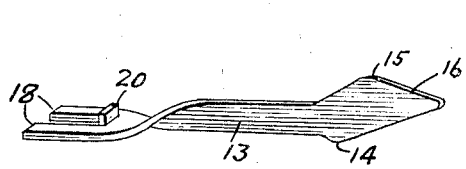
Fig. 3 is a perspective view of the lever that forms part of the cock.
Figure 4:
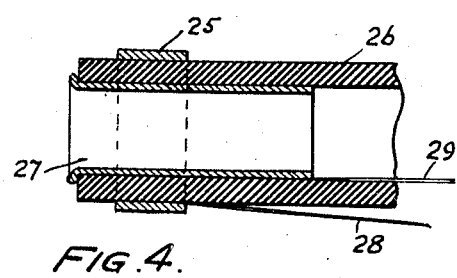
Fig. 4 is a cross section of the end of the flexible tube adapted to connect a milking machine unit, through the stall cock, with the vacuum pipe line.

The body of my improved stall cock is in the form of a T with a tubular stem 1 and a head 2 having a large bore 3 extending from one end past the junction with the stem 1 and a smaller bore 4 extending from the end of the large bore to the other end of the head. The end with the smaller bore is externally threaded at 5 for screw connection with a vacuum pipe line 31.

At the junction of the large and small bores of the cock body is a valve seat 6 against which a soft washer 7 on a valve body 8 is pressed by a spring 9, whose other end is held in a socket 10 in a plug 11 screwed into the more distant end of the large bore 2. A soft washer 12 may be used to make the plug 11 air tight.

Within the stem 1 is a lever 13 with a fulcrum 14 bearing against the inside of the stem and a portion 15 with a sloping edge 16 projecting through a slot 17 in the opposite wall of the stem. The other end of the lever has a fork with two prongs 18 adapted to fit in a groove 19 around the stem of the valve 8, and, at the inner end of the slot, an upturned tongue 20 which rests against the side of the stem of the valve and inside the spring 9 and prevents movement of the lever away from the valve stem.

With the threaded end 5 screwed into a pipe line in which a partial vacuum exists, air pressure on top of the valve 8 assists the spring 9 in holding the valve against the seat 6 and preventing entrance of air into the vacuum pipe line.

The end of the flexible tube 26, which connects with a milking machine unit, is preferably provided with a metallic ferrule 27 having a flanged end adapted, when the tube, with the ferrule inside it, is slipped or forced onto the stem 1 of the cock, to engage a soft ring 30 around the neck of the stem, thereby assisting in making an airtight joint between the stem and the ferrule.

When the flexible tube 26 is engaged with the stem 1 as just described, it will, as it slides along the sloping edge 16, force the outer end of the lever 13 down. The inner end will then move up and raise the valve 8, with its washer 7, away from the seat 6 and open communication from the stem 1 and the attached tube 26 to the inside of the pipe line and thus exhaust air from the tube and the connected milking unit. Upon the withdrawal, after completion of milking, of the tube 26 from the stem of the cock, the spring 9 seats the valve 8, and the lever 13 is returned to the position shown in Fig. 1.

With milking machine units requiring, preliminary to operation, in addition to connection with a partial vacuum, a connection with a source of electric power, the following means are provided to close the electric circuit simultaneously, or approximately simultaneously, with the establishment of the vacuum connection above described. A contact member, preferably a spring 21, is clamped by screws 22 between insulating pieces 23 and has a wire 24 connected with a source of power (not shown). Tube 26 has a metallic collar 25 which, when the tube is forced onto the stem 1 as hereinbefore described, contacts with spring 21. Wires 28 and 29, connected respectively with collar 25 and ferrule 27, lead to any electrically operable device that may be embodied in the milking machine unit with which tube 26 is connected. In the connection of the tube 26 with the stall cock the circuit is completed, from the source of electric power (not shown), through wire 24, contact spring 21, collar 25, wire 28 to the milking machine unit, wire 29 from the milking machine unit, ferrule 27, the metal of the cock and thence through the vacuum pipe line to the source of electric power.

What I claim and desire to protect by Letters Patent is:

1. A stall cock for milking machine installations comprising a body in the form of a hollow T having two ends and a branch, one of said ends being adapted for connection with a pipe line, a cap closing the other of said ends, the branch being adapted to have a hose slipped over it, a compressible packing against which said hose is adapted to make a tight joint, a check valve within the body adapted when seated to close communication from the body to the pipe line, a lever fulcrumed within the branch and extending lengthwise thereof and having a portion so projecting through a slot in the branch that a hose slid over the branch will swing the lever on its fulcrum, and means operative to unseat the valve when the lever is so operated.

2. A stall cock for milking machine installations comprising a body in the form of a hollow T having two ends and a branch, one end being adapted for connection with a pipe line and the other end being closed and having a valve seat at its junction with the first named end, the branch being adapted to make an air tight joint with a tube slipped over it, a valve within the body adapted to cooperate with the seat and close communication between the body and said pipe line, a lever fulcrumed within the branch having on one end a portion adapted to project through a slot in the branch so as to be depressed by a tube slipped over it, and means at the other end of the lever adapted to raise the valve from the seat when the first end is depressed.

3. A stall cock for milking machine installations comprising a body in the form of a T with a hollow stem and, at right angles thereto, a body having a bore with large and small diameter portions and a valve seat at the junction of the two portions, a valve adapted, when in contact with the seat, to close communications from the large to the small bore, a lever, fulcrumed within the branch, having at one end a portion projecting through a slot therein so as to be depressed when a tube is slipped thereover, a fork at the other end of the lever adapted to cooperate with a groove around the valve stem to raise the valve from its seat when the first mentioned end is depressed, a tongue upturned at the side of the valve stem, a closure for the large bore, and a coil spring having one end abutting against said closure and the other end abutting against the fork of the lever to press it and the valve toward the seat and, by surrounding the valve stem and tongue, prevent movement of the lever away from the valve stem.

4. A stall cock for milking machine installations comprising a body in the form of a T having a hollow stem adapted to make an air tight connection with a tube slipped thereover and a head having one end adapted for connection with a pipe line, a large bore extending from the other end past the opening from the branch and having a removable closure at the end, a smaller bore extending from the termination of the large bore through the first mentioned end of the head, there being a valve seat at the junction of the large and small bores, a valve and means to press it toward the seat to thereby close communication between the large and small bores, and a lever, fulcrumed in the stem, with one end projecting through a slot therein so as to be depressed when a tube is slipped thereover and the other end so connected with the valve as to raise it from its seat and open communication between the large and small bores when the first end of the lever is depressed.

WALTER A. SCOTT.